May 3, 1966

M. J. ARAGE 3,248,815

BEAUTY SHOP COIFFURE PROFILE AND ILLUMINATED
DISPLAY ENCLOSURE

Filed Nov. 18, 1963

INVENTOR.
MAURICE ARAGE
BY
Kimmel & Crowell
ATTORNEYS.

United States Patent Office 3,248,815
Patented May 3, 1966

3,248,815
BEAUTY SHOP COIFFURE PROFILE AND
ILLUMINATED DISPLAY ENCLOSURE
Maurice J. Arage, 3213 Lanier Drive, Corpus Christi, Tex.
Filed Nov. 18, 1963, Ser. No. 324,407
1 Claim. (Cl. 40—33)

This invention relates to a coiffure or hair stylist display on a simulated bust, and more particularly to a type of profile and the like for illustrating, advertising, or modeling coiffures, which is enclosed in a viewable weather proof display case having a rotating mount for the profile or bust accompanied with a plurality of selective colored and sequenced illuminating means.

An important object of this invention is to provide a display device to serve as an emblem for beauty shop establishments in the same fashion as a barber pole designates the locale where a man can have his hair cut.

In the present day beauty shop or hair stylist trade of hair-dos, wigs, and the like, much time is saved and business is increased if the meticulous and modern prospective feminine customer can see a simulated modeling of her choice of desired hair-do, whether it be of a blond, brunette, petite or of the pleasingly plump type of customer.

The present invention may also be utilized to solve the above problem by providing various busts or profiles as desired on a rotating table mounting within an illuminated display case having side access and transparent panels therein for applying various types of desired hair-dos to a particular type of profile corresponding somewhat in similarity to that of a prospective customer.

A further object of this invention is to provide an advertising or modeling display of various types of feminine profiles adaptable to illustrate various types of hair-dos, wigs and the like thereon under various simulated colored lighting environments.

Another object of this invention is to provide an illuminated transparent enclosure having a rotary base for supporting various types of feminine profiles thereon.

A further object of the invention is to provide viewing of a prospective coiffure and ruff of favorite dress material or the like on a simulated modeling bust or profile for a hair stylist's customers.

A still further object of the invention is to provide a selective and sequenced illumination for displaying prospective hair-dos as desired by a customer.

Other objects and advantages of the invention will become apparent to those skilled in the art as will be readily apparent from consideration of the following specification relating to the annexed drawings in which.

Figure 1:
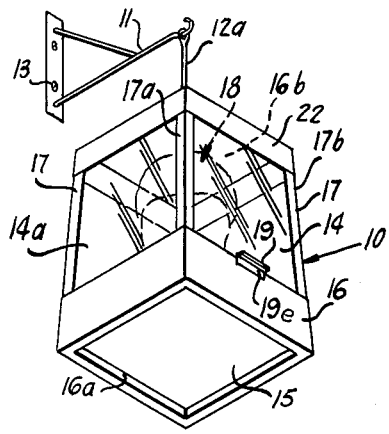
FIGURE 1 is a perspective view of the invention, as mounted on a wall or the like, for display purposes.

Referring more specifically to the drawings wherein like reference numerals represent like parts, and especially to FIGURE 1, reference numeral 10 designates the display case of the present invention. Case 10 is carried by bracket 11 supporting an upstanding handle 12 and keeper 12a. The bracket 11 may be fixedly secured by screws 13 to a wall or the like. Display case 10 has transparent front viewing glass or plastic panel 14 and similar side and rear panels 14a, a bottom 15 secured to a base 16, and a top 16b secured to keeper 12a. Base 16 is secured to top 16b by upstanding corner structural members 17, 17a, and 17b. The outline of bust or profile means 18 may be seen through the panels 14 and 14a in various positions during rotation within display case 10. Handle 19 is secured slightly above the lower edge of front panel 14 and serves as a lower stop therefor. Panel 14 is surrounded by a frame 14b and the lower edge of frame 14b normally rests behind the top of the front panel of base 16 and 19 serves as a handle means for raising panel 14 to permit removal of the same to replace or service profile 18 with various types of hair-dos and the like. Base 16 has an angle member 19e fixed to the outer front side thereof on which handle means 19 rests to support frame 14b and panel 14.

Figure 2:
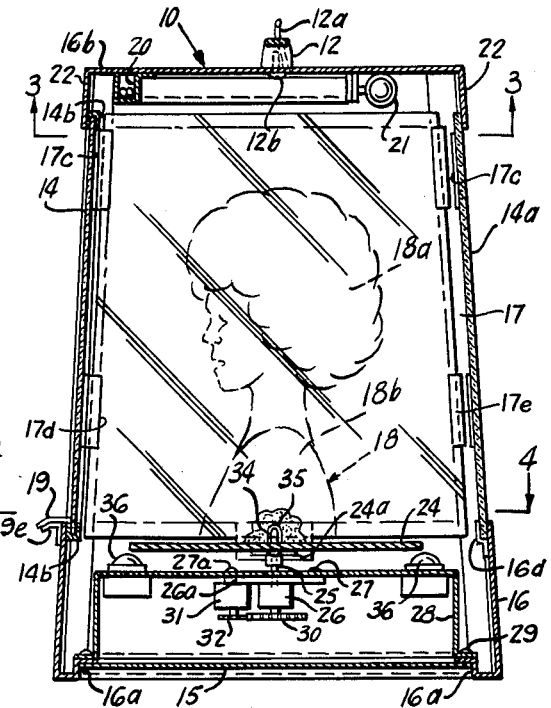
FIGURE 2 is a cross-sectional view in elevation of the display case having illuminating lights therein, a bust removably mounted on a motor actuated support turntable and removable transparent glass panels adapted for servicing and display of various types of hair-dos on a desired profile.
Figure 3:
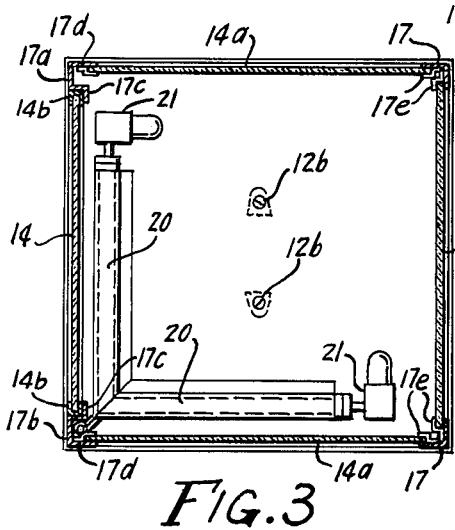
FIGURE 3 is a sectional view of FIGURE 2 taken on lines 3—3 of FIGURE 2 in the direction of the arrows.

In FIGURES 2 and 3, top 16b is of stainless steel or other desired material and fixedly supports electrical conduit means 20 spot welded thereto. Conduit means 20 supports illuminating means 21 secured at each end thereof as more clearly shown in FIGURE 3. Top 16b has a depending flange 22 behind which the upper edge of transparent panel 14 is normally retained. Handle means 12 is secured to the outer surface of top 16b by means of screws 12b, as shown.

Structural members 17a and 17b have a plurality of angle recess means 17c to restrain inward movement of the vertical edge portions of front panel 14. When panel 14 is lifted slightly to clear the front of base 16 and its lower edge tilted slightly outward by handle 19 it may then be lowered out of engagement with flange 22 and lifted forwardly out of its abutting engagement with angle means 17c to permit access to bust or profile 18. Likewise, structural members 17a and 17b contain a plurality of angle recess means 17d to receive the contiguous vertical edges of side panel 14a. Structural members 17 also have on each angle edge a plurality of spaced angle-like recesses 17e to receive rear panel 14a.

The side and back top portions of base 16 have internal angle-like recesses 16d suitably fixed thereto to receive the lower edges of panels 14a. Base 16 has an upturned angle portion 16a adapted to receive and support bottom 15, as best shown in FIGURE 2.

A turntable 24 is suitably mounted on a plate 24a carried by a rotary shaft 25 mounted in bearing box 26 which is secured by screws 27 to a mounting platform 28 secured in turn by screws 29 to angle portion 16a of base 16. The lower end of shaft 25 carries a gear 30 suitably fixed thereto. A motor 31 is secured by screws 27a to plate 26a, and drives shaft 25 through gears 32 and 30, as shown.

Turntable 24 has upstanding projections 34 which engage recesses 35 in the bottom portion of bust or profile means 18.

Mounting platform 28 supports thereon lights 36. Bust 18 rotatably advertises or models various desired coiffure 18b during use. Ruff 18a is of a favorite dress material which may be draped about the neck of the profile to assist in the selection of a particular coiffure for a particular occasion.

Figure 4:
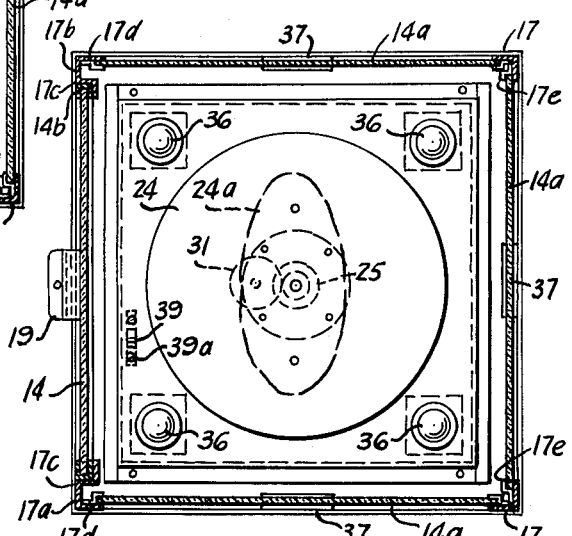
FIGURE 4 is a sectional view of FIGURE 2 taken on lines 4—4 in the direction of the arrows.

FIGURE 4 discloses a top view of the invention in which turntable 24 is suitably mounted above mounting platform 28 with lights 36, and switch 39 secured by screws 39a, all contiguously mounted thereon, as shown.

Figure 5:
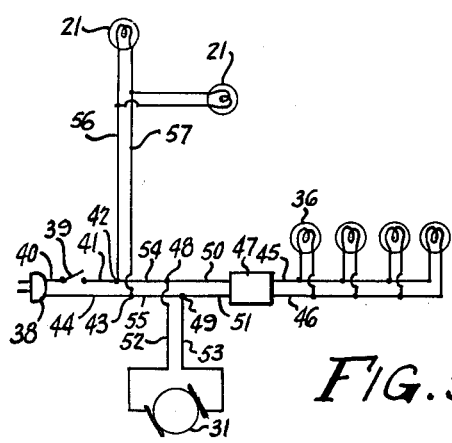
FIGURE 5 is a schematic circuit diagram for energizing the motorized turntable and two parallel circuits for various types of illumination lights for the display enclosure of the present invention.

FIGURE 5 discloses a schematic electrical circuit for selectively energizing lights 21 and 36 and motor 31 by a conventional plug 38 adapted to be received by an energized electrical outlet receptacle. FIGURE 5 discloses a switch 39 connected by lead 40 to plug 38 and by lead 41 to point 42 of the circuit. Point 43 of the circuit is connected by lead 44 to plug 38. Lights 36 are connected in parallel by leads 45 and 46 to a conventional circuit intermittent interrupter means 47, of any desired type. For example, interrupter means 47 may be of a simple type depending on the periodic heating, expanding, and opening of a metal contact element in the circuit, if desired, as is well known by those skilled in the art. Points 48 and 49 of the circuit are connected by leads 50 and 51 to intermittent interrupter means 47, and by leads 52 and 53 to motor 31. Points 48 and 49 are also connected by leads 54 and 55 to points 42 and 43 of the circuit, respectively. Lights 21 are connected by leads 56 and 57 to points 42 and 43 of the circuit, as shown. In other words, lights 21 and 36 and motor 31 are all connected in parallel circuit arrangement to energized leads 41 and 44. Motor 31 may be of a shaded pole synchronous type as customarily used in phonograph turntables or may be of other self-starting commercial types, as desired.

During use, panel 14 is removed as previously described and a bust or profile 18 is securely placed on turntable 24 with projections 34 comating with recesses 35 in the bottom of bust 18. Then a selection of modern coiffure hair-dos are selectively modeled on rotating bust 18 by turntable 24 and motor 31, lights 21 and 36 being actuated by selectively closing energizing switch 39. During operation of the present invention upper lights 21 remain on for viewing the selected coiffure under normal evening lighting conditions and lights 36, each being of different illumination colors as selectively seen through each of the four transparent panels of the display case 10, uniquely and periodically simulate viewing of a coiffure under various evening lighting effects, decors accompanied with various colors of dress and the like, as commonly seen in a hotel dining room, dance hall, or social room and the like during an evening social event.

From the foregoing it will now be seen that there is herein provided an improved and novel beauty shop coiffure modeling bust profile and variously illuminated color display enclosure which accomplishes all the objects of this invention, and others, including many advantages of great practical utility and commercial importance.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention set forth in the appended claim.

I claim:

A device for selectively displaying coiffure styles comprising, in combination, a rectangular base having means defining a receptacle including a top and sides interiorly of said base, a bottom plate removably closing said receptacle, an electric motor and a bearing box in said receptacle, a shaft extending through the top of said receptacle, a turntable mounted on said shaft, gearing connecting said motor and said bearing box for rotating said turntable, protuberances extending upwardly from said turntable, a profile bust adapted for selective coiffure means including a base having recesses therein for the reception of said protuberances removably to mount said profile bust on said turntable, varicolored lights extended through the top of said receptacle exteriorly of the periphery of said turntable for variously illuminating said profile bust, flanged corner posts extending upwardly from each corner of said base, a top cover having a depending flange mounted on said corner posts, said base including an upstanding flange along each edge thereof, transparent panels enclosing said profile bust mounted behind said flanges on said base and said top cover and extending between said base and cover, side flanges on said corner posts retaining said panels, means including an exteriorly protruding handle and a stop on the exterior of said base permitting removal and replacement of one of said panels to provide access to said bust, fixed illuminating means carried interiorly of said top cover, electrical circuitry connecting said motor, said varicolored lights and said illuminating means to a source of electric current, an electric switch for energizing and de-energizing said circuitry, and intermittent interrupter means in said circuitry causing intermittent flashing of said varicolored lights.

References Cited by the Examiner

UNITED STATES PATENTS

| | | | |
|---|---|---|---|
| 403,099 | 5/1889 | Goddard | 312—135 |
| 678,612 | 7/1901 | Daemicke | 62—297 |
| 1,099,879 | 6/1914 | Hutchings | 40—77 |
| 1,178,732 | 4/1916 | Koken | 40—33 |
| 1,237,502 | 8/1917 | Gonzales | 40—33 |
| 1,675,154 | 6/1928 | Boxer | 35—59 |
| 1,700,328 | 1/1929 | Nicholson | 40—33 |
| 1,740,845 | 12/1929 | Tilbe | 40—33 |
| 2,049,929 | 8/1936 | Schlachman | 40—33 X |
| 2,066,310 | 1/1937 | Appel | 312—140 X |
| 2,086,665 | 7/1937 | Fisher | 40—126 |
| 2,543,008 | 2/1951 | French | 312—125 X |

CLAUDE A. LE ROY, *Primary Examiner.*

A. FRANKEL, *Assistant Examiner.*